United States Patent
Maslov et al.

(10) Patent No.: US 11,568,297 B2
(45) Date of Patent: Jan. 31, 2023

(54) EFFICIENT SYNTHESIS OF A RANDOM UNIFORMLY DISTRIBUTED CLIFFORD UNITARY

(71) Applicant: INTERNATIONAL BUSINESS MACHINES CORPORATION, Armonk, NY (US)

(72) Inventors: Dmitri Maslov, New Canaan, CT (US); Sergey Bravyi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/810,553

(22) Filed: Mar. 5, 2020

(65) Prior Publication Data
US 2021/0287125 A1  Sep. 16, 2021

(51) Int. Cl.
*G06N 10/00* (2022.01)
*G06F 17/16* (2006.01)
*G06F 17/18* (2006.01)

(52) U.S. Cl.
CPC ............. *G06N 10/00* (2019.01); *G06F 17/16* (2013.01); *G06F 17/18* (2013.01)

(58) Field of Classification Search
CPC .......... G06N 10/00; G06F 17/18; G06F 17/16
USPC ......................................................... 706/62
See application file for complete search history.

(56) References Cited

U.S. PATENT DOCUMENTS

| | | | |
|---|---|---|---|
| 8,386,899 B2 | 2/2013 | Goto et al. | |
| 9,514,415 B2 | 12/2016 | Bocharov et al. | |
| 10,242,321 B2 | 3/2019 | Bocharov et al. | |
| 10,496,931 B2 | 12/2019 | Schoennenbeck et al. | |
| 2014/0264288 A1* | 9/2014 | Svore | B82Y 10/00 257/31 |
| 2014/0280404 A1* | 9/2014 | Svore | G06N 10/00 708/200 |

(Continued)

OTHER PUBLICATIONS

Niemann et al., "Efficient synthesis of quantum circuits implementing Clifford group operations", 19th Asia and South Pacific Design Automation Conference (ASP-DAC); 2014, IEEE, USA, ISBN 9781479928163.

(Continued)

*Primary Examiner* — Tan V Mai
(74) *Attorney, Agent, or Firm* — Henry J. Daley; Venable LLP

(57) ABSTRACT

A method of generating a random uniformly distributed Clifford unitary circuit (C) includes: generating a random Hadamard (H) gate; drawing a plurality of qubits from a probability distribution of qubits; applying the random H gate to the plurality of qubits drawn from the probability distribution; and generating randomly a first Hadamard-free Clifford circuit (F1) and a second Hadamard-free Clifford circuit (F2). The first and second Hadamard-free Clifford circuits is generated by at least randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits. The method further includes combining the generated first Hadamard-free circuit (F1) and the second Hadamard-free Clifford circuit (F2) with the generated random Hadamard (H) gate to form the random uniformly distributed Clifford unitary circuit (C).

20 Claims, 4 Drawing Sheets

(56) References Cited

U.S. PATENT DOCUMENTS

2017/0220948 A1     8/2017    Bocharov et al.
2019/0095561 A1     3/2019    Pednault et al.
2019/0378032 A1    12/2019    Kliuchnikov et al.

OTHER PUBLICATIONS

Magesan et al., "Efficient measurement of quantum gate error by interleaved randomized benchmarking", Phys. Rev. A 77, 012307 (2008), Phys. Rev. A 85, 042311 (2012), arXiv:1203.4550v2 [quant-ph] Mar. 19, 2014.

Gosset et al., "A compressed classical description of quantum states", arXiv:1801.05721v2 [quant-ph] Jun. 27, 2019.

DiVincenzo et al., "Quantum Data Hiding", arXiv:quant-ph/0103098v1 Mar. 16, 2001.

Bennett et al., "Mixed State Entanglement and Quantum Error Correction", arXiv:quant-ph/9604024v2 Aug. 8, 1996.

Magesan et al., "Scalable and Robust Randomized Bnchmarking of Quantum Processes", Physical Review Letters 106, 180504 (2011).

Koenig et al., "How to efficiently select an arbilrary Clifford group element", arXiv:1406.2170v1 [quant-ph] Jun. 9, 2014.

Maslov et al. "Shorter stabilizer circuits via Bruhat decomposition and quantum circuit transformations" arXiv:1705.09176v2 [quant-ph] Jun. 23, 2018.

Shende et al.,"Synthesis of quantum-logic circuits", IEE Trans. on CAD, vol. 25, No. 6, pp. 1000-1010, 2006.

Saeedi et al., "Quantum Information & Computation", vol. 11, No. 3&4, 2011.

Dana Randall "Efficient Generation of Random Nonsingular Matrices" Wiley online library: vol. 4, Issue 1, 1993, pp. 111-118.

Aaronson et al., "improvea Simulation or stabilizer Circuits" Cornell University arXiv:quant-ph/0406196v5 Jun. 18, 2008.

Amy et al., "A meet-in-the-middle algorithm for fast synthesis of depth-optimal quantum circuits" Cornell University arXiv:1206.0758v3 [quant-ph] Jan. 25, 2013.

\* cited by examiner

EFFICIENT SYNTHESIS OF A RANDOM UNIFORMLY DISTRIBUTED CLIFFORD UNITARY

BACKGROUND

The currently claimed embodiments of the present invention relate to quantum computation, and more specifically, to methods of generating a random uniformly distributed Clifford unitary circuit (C).

Clifford circuits can be used in quantum computing for quantum error correction and in fault-tolerant computations. Optimization of Clifford circuits can be useful within the scope of fault-tolerant computations, as the Clifford overhead can dominate the cost of an implementation, despite the cost of the non-Clifford gates being higher than that of the Clifford gates. Clifford circuits can also be used in the study of entanglement and in the study of noise in quantum computers via randomized benchmarking (RB). Random uniformly distributed Clifford circuits have many applications in quantum computing including in randomized benchmarking protocols, randomized quantum code construction, quantum data hiding, and in compressed classical description of quantum states.

SUMMARY

An aspect of the present invention is to provide a method of generating a random uniformly distributed Clifford unitary circuit (C). The method includes generating a random Hadamard (H) gate; drawing a plurality of qubits from a probability distribution of qubits; applying the random H gate to the plurality of qubits drawn from the probability distribution; generating randomly a first Hadamard-free Clifford circuit (F1) and a second Hadamard-free Clifford circuit (F2), wherein each of the first and second Hadamard-free Clifford circuits is generated by at least randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and combining the generated first Hadamard-free circuit (F1) and the second Hadamard-free Clifford circuit (F2) with the generated random Hadamard (H) gate to form the random uniformly distributed Clifford unitary circuit (C).

In an embodiment, the first and second Hadamard-free circuits are different from each other. In an embodiment, generating randomly the first Hadamard-free Clifford circuit (F1) and the second Hadamard-free Clifford circuit (F2) includes randomly generating the uniformly distributed phase (P) gate, randomly generating the uniformly distributed linear Boolean invertible conditional NOT (CNOT) gate, and randomly generating a uniformly distributed conditional rotation around axis-Z (CZ) gate, and combining the P, CZ, and CNOT gates to form the first and second Hadamard-free Clifford circuits. In an embodiment, generating the CZ gate includes generating the CZ gate from a plurality of random qubits. In an embodiment, generating the CZ gate from the plurality of random qubits includes generating the CZ gate from a (n−1) n/2-tuple of random qubits, wherein n is greater than or equal to 2. In an embodiment, generating the uniformly distributed phase (P) gate includes generating the P gate from a plurality of random qubits. In an embodiment, generating the P gate from the plurality of random qubits includes generating the P gate from a 2n-tuple random qubits, where n is an integer greater than or equal to 2. In an embodiment, the P gate corresponds to a diagonal matrix having 1 or imaginary number i as diagonal elements and 0 everywhere else.

In an embodiment, generating the uniformly distributed linear Boolean invertible conditional NOT (CNOT) gate includes generating a lower triangular random matrix having random qubits 0 and/or 1; generating an upper triangular random matrix having random qubits 0 and/or 1; and multiplying the lower triangular random matrix and the upper triangular random matrix to generate the uniformly distributed linear Boolean invertible CNOT gate.

In an embodiment, the first Hadamard-free Clifford circuit F1 is equal to a product P1.CZ1.CNOT1 and the second Hadamard-free Clifford circuit F2 is equal to a product P2.CZ2.CNOT2 so that F1 is different from F2. In an embodiment, the random uniformly distributed Clifford unitary circuit C is equal to F1.H.F2, wherein F1 is the first Hadamard-free Clifford circuit, F2 is the second Hadamard-free Clifford circuit, and H is the Hadamard gate.

In an embodiment, drawing the plurality of qubits from the probability distribution of qubits includes drawing the plurality of qubits from the following probability distribution Pr(k):

$$Pr(k) = 2^{k(k+1)/2} \frac{\prod_{j=1}^{n} (2^j-1)(2^j+1)^{-1}}{\prod_{j=1}^{k} (2^j-1) \prod_{j=1}^{n-k} (2^j-1)}$$

wherein k is a sub-plurality of qubits selected from a plurality of qubits n such that k=0, 1, ..., n, and j is a local variable in this equation.

In an embodiment, a computational complexity of generating the random uniformly distributed Clifford unitary circuit (C) grows quadratically with a number of the plurality of qubits. In an embodiment, the method further includes providing the random uniformly distributed Clifford unitary circuit to a quantum mechanical circuit to measure noise in the quantum mechanical circuit.

Another aspect of the present invention is to provide a computer readable medium on which is stored non-transitory computer-executable code, which when executed by a classical computer causes a quantum computer to: generate a random Hadamard (H) gate; draw a plurality of qubits from a probability distribution of qubits; apply the random H gate to the plurality of qubits drawn from the probability distribution; generate randomly a first Hadamard-free Clifford circuit (F1) and a second Hadamard-free Clifford circuit (F2), wherein each of the first and second Hadamard-free Clifford circuits is generated by at least randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and combine the generated first Hadamard-free Clifford circuit (F1) and the second Hadamard-free Clifford circuit (F2) with the generated random Hadamard (H) gate to form the random uniformly distributed Clifford unitary circuit (C).

In an embodiment, the first and second Hadamard-free Clifford circuits are different from each other. In an embodiment when the non-transitory computer-executable code is executed by the classical computer further causes the quantum computer to randomly generate the uniformly distributed phase (P) gate, randomly generate the uniformly distributed linear Boolean invertible conditional NOT (CNOT) gate, and randomly generate a uniformly distributed conditional rotation around axis-Z (CZ) gate, and combine the P, CZ, and CNOT gates to form the first and second Hadamard-free Clifford circuits. In an embodiment, when the non-transitory computer-executable code is executed by the classical computer further causes the quantum computer to: generate a lower triangular random matrix having random qubits 0 and/or 1; generate an upper triangular random matrix having random qubits 0 and/or 1; and multiply the lower triangular random matrix and the upper triangular random matrix to generate the uniformly distributed linear Boolean invertible CNOT gate. In an embodiment, a computational complexity of forming the random uniformly distributed Clifford unitary circuit (C) grows quadratically with a number of the plurality of qubits.

A further aspect of the present invention is to provide a classical computer configured to execute a non-transitory computer-executable code, the code when executed by the classical computer causes a quantum computer to: generate a random Hadamard (H) gate; draw a plurality of qubits from a probability distribution of qubits; apply the random H gate to the plurality of qubits drawn from the probability distribution; generate randomly a first Hadamard-free Clifford circuit (F1) and a second Hadamard-free Clifford circuit (F2), wherein each of the first and second Hadamard-free Clifford circuits is generated by randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and combine the generated first Hadamard-free Clifford circuit (F1) and the second Hadamard-free Clifford circuit (F2) with the generated random Hadamard (H) gate to form the random uniformly distributed Clifford unitary circuit (C).

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
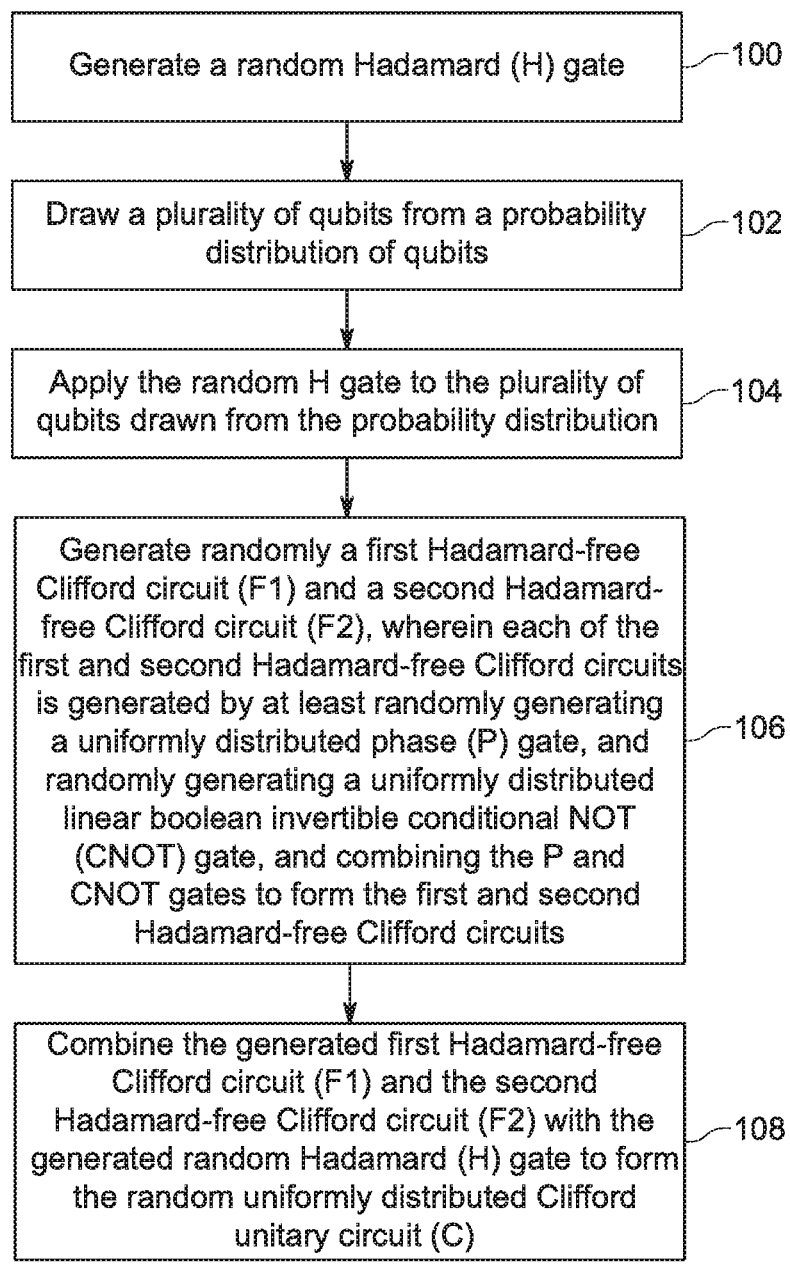
FIG. 1 is a flow chart of a method of generating a random uniformly distributed Clifford unitary circuit (C), according to an embodiment of the present invention.

FIG. 1 is flow chart of a method of generating a random uniformly distributed Clifford unitary circuit (C), according to an embodiment of the present invention. The method includes generating a random Hadamard (H) gate, at S100 and drawing a plurality of qubits from a probability distribution of qubits, at S102. The method further includes applying the random H gate to the plurality of qubits drawn from the probability distribution, at S104. The method further includes generating randomly a first Hadamard-free Clifford circuit (F1) and a second Hadamard-free Clifford circuit (F2), at S106. Each of the first and second Hadamard-free Clifford circuits is generated by randomly generating a uniformly distributed phase (P) gate, and randomly generating a uniformly distributed linear Boolean invertible conditional NOT (CNOT) gate, and combining the (P) and (CNOT) gates to form the first and second Hadamard-free Clifford circuits. The method also includes combining the generated first Hadamard-free Clifford circuit (F1) and the second Hadamard-free Clifford circuit (F2) with the generated random Hadamard (H) gate to form the random uniformly distributed Clifford unitary circuit (C), at S108. A Hadamard-free Clifford circuit is a Clifford circuit that does not have a Hadamard gate. Therefore, the Hadamard-free Clifford circuits (F1) and (F2) are decoupled from the Hadamard (H) gate.

In an embodiment, the random uniformly distributed Clifford unitary circuit (C) is equal to the product F1.H.F2, with (F1) being the first Hadamard-free Clifford circuit, (F2) the second Hadamard-free Clifford circuit, and (H) is the Hadamard gate. As it is understood in the quantum computing art, a mathematical operation, such as the product F1.H.F2, is implemented using a physical quantum circuit in a quantum mechanical computer. Therefore, the Clifford unitary circuit (C) circuit is generated or formed by combining the first Hadamard-free Clifford circuit (F1) and the second Hadamard-free Clifford circuit (F2) with the generated random Hadamard (H) gate.

In an embodiment, the first Hadamard-free Clifford circuit (F1) is equal to a product P1.CZ1.CNOT1 and the second Hadamard-free Clifford circuit (F2) is equal to a product P2.CZ2.CNOT2 so that (F1) is different from (F2). For example, P1 can be different from P2, CZ1 different CZ2 and CNOT1 different from CNOT2. However, as it can be understood, in order to obtain F1 that is different from F2, one can select any one of P1, CZ1 and CNOT1 to be different from the corresponding P2, CZ2, and CNOT2. For example, P1 can be different from P2 while CZ1 can be the same as CZ2 and CNOT1 can be the same as CNOT2, etc.

In an embodiment, the first Hadamard-free Clifford circuit (F1) and the second Hadamard-free Clifford circuit (F2) are different from each other. In an embodiment, generating randomly the first Hadamard-free Clifford circuit (F1) and the second Hadamard-free Clifford circuit (F2) includes randomly generating the uniformly distributed phase (P) gate, randomly generating the uniformly distributed linear Boolean invertible conditional NOT (CNOT) gate, and randomly generating a uniformly distributed conditional rotation around axis-Z (CZ) gate, and combining the (P), (CZ), and (CNOT) gates to form the first and second Hadamard-free Clifford circuits (F1) and (F2).

In an embodiment, generating the (CZ) gate includes generating the (CZ) gate from a plurality of random qubits. In an embodiment, generating the (CZ) gate from the plurality of random qubits includes generating the (CZ) gate from a (n−1) n/2-tuple of random qubits, wherein n is greater than or equal to 2.

In an embodiment, generating the uniformly distributed phase (P) gate includes generating the (P) gate from a plurality of random qubits. In an embodiment, generating the (P) gate from the plurality of random qubits includes generating the (P) gate from a 2n-tuple random qubits, where n is an integer greater than or equal to 2. In an embodiment, the (P) gate corresponds to a diagonal matrix having 1 or imaginary number i as diagonal elements and 0 everywhere else.

In an embodiment, generating the uniformly distributed linear Boolean invertible conditional NOT (CNOT) gate includes generating a lower triangular random matrix (A) having random qubits 0 and/or 1; generating an upper triangular random matrix (T) having random qubits 0 and/or 1; and multiplying the lower triangular random matrix (A) and the upper triangular random matrix (T) to generate the uniformly distributed linear Boolean invertible (CNOT) gate (CNOT=A.T). The term "multiplying" should be understood as a mathematical operation in a quantum mechanical circuit. "Multiplying" in a quantum mechanical circuit involves configuring a quantum circuit to perform the operation.

In an embodiment, the uniformly distributed linear Boolean invertible (CNOT) gate can be generated by implementing the following Python code, for example.

```
import numpy as np
n = 3                                          # matrix size
A = np.random.randint(2, size=(n, n))
T = np.zeros((n,n),dtype=int)
rows = list(range(n))
print ('rows =', rows)
print ("")
for j in range(n-1):
    v = np.random.randint(2,size=(1,n-j))      # pick random uniform nonzero n-bit string
    while np.count_nonzero(v)==0:
        v = np.random.randint(2,size=(1,n-j))
    r = np.nonzero(v)[1][0]                    # let r be the first nonzero element of v
    A[j,rows] = 0; A[j,rows[r]] = 1            # assign values to A
    for i in range(n-j):                       # assign values to T
        T[rows[r],rows[i]] = v[0,i]
    del rows[r]
A[n-1,rows[0]] = 1
T[rows[0],rows[0]] = 1
U = np.matmul(A,T) % 2                         # compute the random uniform invertible matrix
print(U)
```

In an embodiment, drawing the plurality of qubits from the probability distribution of qubits includes drawing the plurality of qubits from the following probability distribution Pr(k):

$$Pr(k) = 2^{k(k+1)/2} \frac{\prod_{j=1}^{n} (2^j - 1)(2^j + 1)^{-1}}{\prod_{j=1}^{k} (2^j - 1) \prod_{j=1}^{n-k} (2^j - 1)}$$

wherein k is a sub-plurality of qubits selected from a plurality of qubits n such that k=0, 1, . . . , n, and j is a local variable in this equation.

In an embodiment, a computational complexity of generating the random uniformly distributed Clifford unitary circuit (C) grows quadratically (e.g., approximately in $n^2$) with the number of the plurality of qubits n. In contrast, conventional computational methods, the computational complexity grow cubically (i.e., $n^3$) with the number of the plurality of qubits n. In an embodiment, a number of random qubits used to generate the random Clifford unitary is about $3n^2$ whereas conventional generation of the random Clifford unitary only uses $2n^2$ random qubits. However, any increase in the number of random qubits that are used to generate the random Clifford unitary C in the present method compared to conventional methods in fact provides a decrease in the computational complexity from n3 in conventional methods to $n^2$ in the present method. This, in turn, provides almost a 1000-fold reduction in runtime, as will be described further in the following paragraphs.

Figure 2:
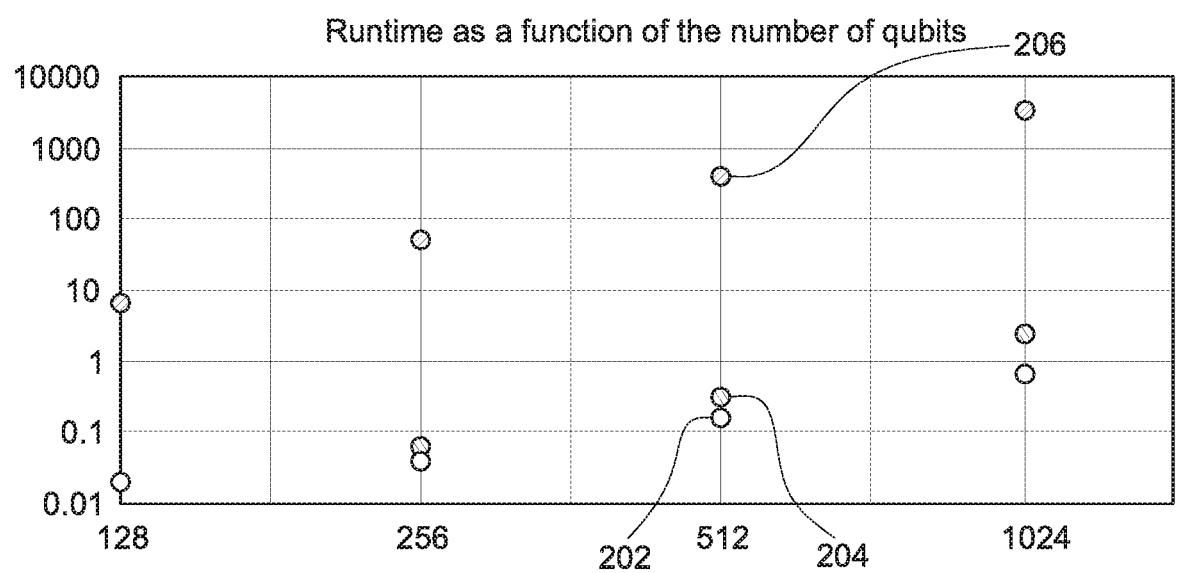
FIG. 2 is a plot showing a comparison between a runtime of the present method of generating the random Clifford unitary circuit and a runtime of a conventional method of generating the random Clifford unitary circuit as a function of a number of qubits, according to an embodiment of the present invention.

FIG. 2 is a plot showing a comparison between a runtime of the present method of generating the random Clifford unitary circuit and a runtime of a conventional method of generating the random Clifford unitary circuit as a function of a number of qubits, according to an embodiment of the present invention. The horizontal axis corresponds to the number of qubits and the vertical axis corresponds to the runtime. Dots 202 in the plot correspond to the runtime of a first method requiring that the Clifford unitary be generated in the form of a tableau. It is noted that the complexity of the implementation scales cubically in n (this said, it can be improved to $O(n^{2.3729})$ with the use of advanced matrix multiplication algorithms), but is still a lot more efficient than dots 206, showing the state of the art, per Koenig and Smolin. Dots 204 correspond to the runtime in the scenario when the answer can be given in a circuit or phase polynomial form using a second method according to an embodiment of the present invention. The complexity of generating dots 202 is quadratic. As such, for larger n, (not shown) the gap in efficiency of 202 (the first method) compared to 204 (the second method) will continue widening, with 202 (the first method) being more efficient. Dots 206 in the plot correspond to the runtime of a conventional method (Koenig-Smolin method) of generating the Clifford unitary circuit. As it is clearly shown in this plot, the runtime of the first and second methods (dots 202 and dots 204, respectively) of generating the random Clifford unitary circuit according to embodiments of the present invention is about 1000-fold lower that the runtime of the conventional method of generating the random Clifford unitary circuit. Therefore, the method(s) of generating the random Clifford unitary circuit according to embodiments of the present invention is generally faster than conventional methods of generating the random Clifford unitary circuit.

In an embodiment, the random uniformly distributed Clifford unitary circuit can be provided to a quantum mechanical circuit to measure noise in the quantum mechanical circuit, for example. However, the random uniformly distributed Clifford unitary circuits can be used in may other applications.

Another aspect of the present invention is to provide a computer readable medium on which is stored non-transitory computer-executable code, which when executed by a classical computer causes a quantum computer to: 1) generate a random Hadamard (H) gate; 2) draw a plurality of qubits from a probability distribution of qubits; 3) apply the random H gate to the plurality of qubits drawn from the probability distribution; 4) generate randomly a first Hadamard-free Clifford circuit (F1) and a second Hadamard-free Clifford circuit (F2), wherein each of the first and second Hadamard-free Clifford circuits is generated by randomly generating a uniformly distributed phase (P) gate, and randomly generating a uniformly distributed linear Boolean invertible conditional NOT (CNOT) gate, and combining the (P) and (CNOT) gates to form the first and second Hadamard-free Clifford circuits; and 5) combine the generated first Hadamard-free Clifford circuit (F1) and the second Hadamard-free Clifford circuit (F2) with the generated random Hadamard (H) gate to form the random uniformly distributed Clifford unitary circuit (C).

In an embodiment, the first and second Hadamard-free Clifford circuits (F1) and (F2) can be different from each other. In an embodiment, the computer-executable code when executed by the classical computer further causes the quantum computer to randomly generate the uniformly distributed phase (P) gate, randomly generate the uniformly distributed linear Boolean invertible conditional NOT (CNOT) gate, and randomly generate a uniformly distributed conditional rotation around axis-Z (CZ) gate, and combine the (P), (CZ), and (CNOT) gates to form the first and second Hadamard-free Clifford circuits.

In an embodiment, the computer-executable code when executed by the classical computer further causes the quantum computer to: generate a lower triangular random matrix having random qubits 0 and/or 1; generate an upper triangular random matrix having random qubits 0 and/or 1; and multiply the lower triangular random matrix and the upper triangular random matrix to generate the uniformly distributed linear Boolean invertible (CNOT) gate. In an embodiment, a computational complexity of forming the random uniformly distributed Clifford unitary circuit (C) grows quadratically with a number of the plurality of qubits.

In the following paragraphs we provide details of various implementations of the methods described in the above paragraphs. As stated in the above paragraphs, the methods according to embodiments of the present invention have a complexity $O(n^2)$ (i.e., quadratic) when it suffices to generate the staged decomposition of the form -C-CZ-P-H-P-CZ-C-, for example, and complexity $O(n^{2.3729})$ in the tableau form, due to the necessity to multiply n×n matrices to obtain the tableau. In contrast, in conventional methods for synthesis of a uniformly distributed Clifford circuit, the complexity is $O(n^3)$ (i.e., cubic) which is greater than the complexity $O(n^2)$ of the methods, according to embodiments of the present invention.

Due to the prominent role played by Hadamard-free Clifford circuits as parts of Clifford circuits, we studied their circuit structure further. Hadamard-free Clifford circuits can admit a 3-stage decomposition, for example -C-CZ-P-. We discovered that Hadamard gates can also be helpful in constructing efficient implementations of Hadamard-free Clifford circuits. To this end, in some embodiments, we develop upper and lower bounds on the resource counts enabled by the introduction of Hadamard gates, and construct explicit examples showing advantage by Clifford circuits over optimal {CNOT, CZ, P} circuits and optimal reversible linear circuits (implemented with {NOT, CNOT} gates only), for example.

Structure of the Clifford group: In an embodiment, we provide C(n) the n-qubit Clifford group and $\mathcal{F}(n) \subseteq C^2(n)$ be the subgroup generated by NOT, CNOT, and P=diag(1, i) gates. We refer to $\mathcal{F}(n)$ as the H-free subgroup. One can easily verify that a Clifford operator is H-free if it maps basis vectors into basis vectors, possibly with some phases. For each integer k∈[0, n], we define:

$$H^k := H_1 H_2 \ldots H_k,$$

where $H_i$ is the Hadamard gate acting on the i-th qubit ($H^0$=Id). From Bruhat decomposition, we can infer that any U∈C can be written (non-uniquely) as:

$$U = LH^k R \quad (1)$$

Equation (1) is similar to the equation C=F1.H.F2 provided in the above paragraphs, where U corresponds to C and L and R corresponds to respectively F1 and F2. For some L, R∈$\mathcal{F}(n)$ and integer k∈[0, n]. We would like to examine conditions under which the decomposition in Equation (1) is unique. To this end define a group:

$$\mathcal{F}^k(n) = \mathcal{F}(n) \cap (H^k \mathcal{F}(n) H^k).$$

$\mathcal{F}^k(n)$ is indeed a group, since:
1. Id (identity)∈$\mathcal{F}^k(n)$;
2. for g, h∈$\mathcal{F}^k(n)$ the product, gh∈$\mathcal{F}^k(n)$ since it is in $\mathcal{F}(n)$ as a product of two elements from $\mathcal{F}(n)$ and gh∈$H^k \mathcal{F}(n) H^k$ as a product of two elements in $H^k \mathcal{F}(n) H^k$: the middle Hadamards stage $H^k H^k$ cancels out since $H^2$=Id (identity). As a side note, the unitary matrix product and circuit concatenation are taken in opposite orders;

3. For g∈ $\mathcal{F}^k(n)$ its inverse $g^{-1} \in \mathcal{F}^k(n)$ since g can be written as a circuit over the basis {NOT, CNOT, P} and same but conjugated by Hadamards, and thus the inverted circuit (constructible as a set of inverted gates read in reverse order) is as well.

In an embodiment, we decompose $\mathcal{F}(n)$ into a disjoint union of right cosets of $\mathcal{F}^k(n)$, that is:

$$\mathcal{F}(n) = \coprod_{j=1}^{m} \mathcal{F}^k(n)V_j \qquad (2)$$

Here we fixed some set of coset representatives $\{V_j \in \mathcal{F}(n)\}$ and m is the number of cosets (which depends on n and k).

In an embodiment, any Clifford operator U∈ C(n) can be uniquely written as:

$$U = LH^k V_j \qquad (3)$$

for some integers k∈ [0, n], j∈ [1, m], and some operator L∈ $\mathcal{F}(n)$. Accordingly, the Clifford group is a disjoint union of subsets $\mathcal{F}(n)H^k V_j$. Indeed, we already know that $U = LH^k R$ for some L, R∈ $\mathcal{F}(n)$, as provided in Equation (1). We assume that $$U = L_1 H^{k_1} R_1 = L_2 H^{k_2} R_2 \qquad (4)$$

for some $L_i$, $R_i \in \mathcal{F}(n)$ and some integers $k_i \in [0, n]$. First, we state that $k_1 = k_2$. Indeed, $\langle y|H^k|z\rangle \in \{0, 2^{-k/2}\}$ for any basis vectors y, z and any integer k. We can select any basis vector x such that $\langle x|U|0^n\rangle \neq 0$. Since $L_i$ and $R_i$ map basis vectors to basis vectors (modulo phase factors), from Equation (4), we obtain:

$$|\langle x|U|0^n\rangle| = 2^{-\frac{k_1}{2}} = 2^{-\frac{k_2}{2}}, \qquad (5)$$

that is, $k_1 = k_2 = k$. From Equation (4), one gets $R_2 R_1^{-1} = H^k L_2^{-1} L_1 H^k$ and thus $R_2 R_1^{-1} \in H^k \mathcal{F}(n) H^k$. Since $R_2 R_1^{-1} \in \mathcal{F}(n)$, one can infer that $R_2 R_1^{-1} \in \mathcal{F}^k(n)$. In particular, $R_1$ and $R_2$ belong to the same right coset of $\mathcal{F}^k(n)$. We conclude that the integer k and the coset $\mathcal{F}^k(n)R$ in the Bruhat decomposition Equation (1) are uniquely determined by U. The coset containing R can be $\mathcal{F}^k(n)V_j$. The decomposition in Equation (1) is invariant under the set of simultaneous transformations R→AR and L→LB, where A∈ $\mathcal{F}^k(n)$ is arbitrary and $B := H^k A^{-1} H^k \in \mathcal{F}^k(n)$. Indeed, $$(LB)H^k(AR) = LH^k A_{-1} H^k H^k AR = LH^k R.$$

This transformation can be used to make $R = V_j$. Once the factors $R = V^j$ and $H^k$ are uniquely fixed, the remaining factor $L = U(H^k R)^{-1}$ is also uniquely fixed.

Figure 3:
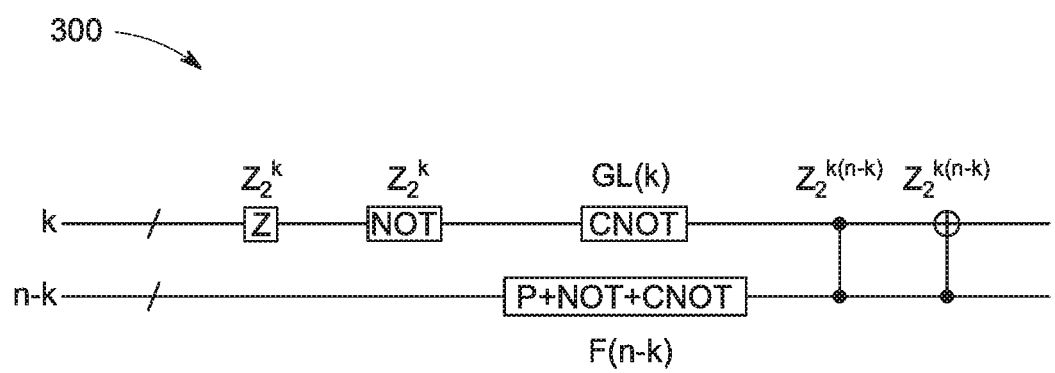
FIG. 3 is a schematic diagram of a quantum mechanical circuit, according to an embodiment of the present invention.

We proceed to exploring the structure of $\mathcal{F}^k(n)$. We provide that any element of $\mathcal{F}^k(n)$ can be implemented by a quantum circuit 300. FIG. 3 is a schematic diagram of the quantum mechanical circuit 300, according to an embodiment of the present invention. In FIG. 3, the subgroup $\mathcal{F}^k(n)$ includes all H-free operators U such that conjugating U by Hadamard gates on the first k qubits gives another H-free operator. In FIG. 3, we illustrate circuit elements that can be used to construct an element of $\mathcal{F}^k(n)$, as well as the groups they generate. We can provide that $$|\mathbf{C}(n)| = 2^{2n+n^2} \prod_{j=1}^{n}(4^j - 1) \qquad (6)$$

where we count the elements of the Clifford group up to the global phase (of ±1, ±i). Likewise, we also count the number of elements in all other groups considered here up to the global phase. We provide Aff(n) to be the affine linear group over the binary field. It is isomorphic to the group generated by NOT and CNOT gates, and isomorphic to the product $\mathbb{Z}_2^n \rtimes (n)$, being groups generated by the NOT gate and the CNOT gates, correspondingly. We have $$|Aff(n)| = 2^n \cdot \prod_{k=0}^{n-1}(2^n - 2^k) = 2^{\frac{n(n+1)}{2}} \prod_{j=1}^{n}(2^j - 1).$$

Aff(n) is a subgroup of $\mathcal{F}(n)$, and factoring out affine linear transformations from $\mathcal{F}(n)$ leads to the leftover group of diagonal Clifford operations, that is equivalent to the combination of a stage of P gates and a stage of CZ gates. We note that the layer of P gates is isomorphic to $\mathbb{Z}_{4\ 2}^{n\ n}$ (each qubit can have an Id, P, $P^2$, or $P^3 = P^\dagger$ be applied to it) and the layer of CZ is isomorphic to $$\mathbb{Z}_2^{\frac{n(n-1)}{2}}$$

(each of n(n−1)/2 CZ gates is either present or not). Therefore, $$\mathcal{F}(n) \cong \mathbb{Z}_4^n \rtimes \mathbb{Z}_2^{\frac{n(n-1)}{2}} \rtimes \mathbb{Z}_2^n \rtimes GL(n),$$

where the first factor represents group generated by P gates, the second factor is the group generated by CZ circuits, the third factor corresponds to the layer of NOT gates, NOT gates and the fourth factor is the general linear group, equivalent to the CNOT gate circuits. Thus $$|\mathcal{F}(n)| = 2^{2n+n^2} \prod_{j=1}^{n}(2^j - 1).$$

In an embodiment, we provide $\mathcal{F}_0^k(n)$ as a subset of $\mathcal{F}^k(n)$ implementable by the quantum circuit shown in FIG. 3. Specifically, $$\mathcal{F}_0^k(n) \cong \mathbb{Z}_{4\ 2}^{n\ k} \times \mathbb{Z}_{4\ 2}^{n\ k} \times GL(k) \times \mathcal{F}(n-k) \times \mathbb{Z}_{4\ 2}^{n\ k(n-k)} \times \mathbb{Z}_{4\ 2}^{n\ k(n-k)} \qquad (7)$$

where:

1. first $\mathbb{Z}_{4\ 2}^{n\ k}$ corresponds to the group of unitaries implementable by Pauli-z gates applied to any of the top k qubits;
2. second $\mathbb{Z}_{4\ 2}^{n\ k}$ corresponds to the group of unitaries implemented with Pauli-x gates applied to any of the top k qubits;
3. GL(k) is the general linear group on first k qubits, it is obtainable by the CNOT gates;
4. $\mathcal{F}(n-k)$ is the group of H-free Clifford circuits spanning n−k qubits;

5. first $\mathbb{Z}_4^n {}_2^{k(n-k)}$ is the group of unitaries implementable as CZ gates with one input in the set of top k qubits, and the other input in the set of bottom n–k qubits;

6. second $\mathbb{Z}_2^{k(n-k)}$ is the group of unitaries implementable as CNOT gates with target in the set of top k qubits, and control in the set of bottom n–k qubits.

We note the conjugation by $H^k$ maps groups in items 1. and 2. as well as items 5. and 6. into each other. The conjugation by $H^k$ is an automorphism of the groups listed under items 3. and 4. It can be shown by inspection of the individual gates that belong to the stages listed in Equation (7) that all these subgroups are contained in $\mathcal{F}^k(n)$. A simple algebra gives $$|\mathcal{F}_0^k(n)| = 2^{2n+n^2 - \frac{k(k+1)}{2}} \prod_{j=1}^{n-k}(2^j - 1) \prod_{j=1}^{k}(2^j - 1) \quad (8)$$

and $$|\mathcal{C}(n)| = |\mathcal{F}(n)| \cdot \sum_{k=0}^{n} \frac{|\mathcal{F}(n)|}{|\mathcal{F}^k(n)|} \leq |\mathcal{F}(n)| \cdot \sum_{k=0}^{n} \frac{|\mathcal{F}(n)|}{|\mathcal{F}_0^k(n)|}, \quad (9)$$

since $|\mathcal{F}^k(n)| \geq |\mathcal{F}_0^k(n)|$

We next show that:

$$|\mathcal{C}(n)| = |\mathcal{F}(n)| \cdot \sum_{k=0}^{n} \frac{|\mathcal{F}(n)|}{|\mathcal{F}_0^k(n)|} \quad (10)$$

By combining Equations (9,10) we conclude that $\mathcal{F}^k(n) = \mathcal{F}_0^k(n)$ for all k.

To prove Equation (10) it is convenient to use Gaussian binomial coefficients:

$$\binom{n}{k}_2 \equiv \frac{\prod_{j=1}^{n}(2^j - 1)}{\prod_{j=1}^{k}(2^j - 1)\prod_{j=1}^{n-k}(2^j - 1)}$$

where $0 \leq k \leq n$. The following identity is also used:

$$\sum_{k=0}^{n} 2^{\frac{k(k-1)}{2}} \binom{n}{k}_2 t^k = \prod_{k=0}^{n-1}(1 + t 2^k) \quad (11)$$

where t is a formal variable. Setting t=2, we can rewrite Equation (11) as follows:

$$\sum_{k=0}^{n} 2^{\frac{k(k+1)}{2}} \binom{n}{k}_2 = \prod_{k=1}^{n}(1 + 2^k). \quad (12)$$

By using the expression for $|\mathcal{F}(n)|$ and Equation (8), we obtain:

$$\frac{|\mathcal{F}(n)|}{|\mathcal{F}_0^k(n)|} = 2^{\frac{k(k+1)}{2}} \binom{n}{k}_2$$

The identity in Equation (12) gives:

$$|\mathcal{F}(n)| \cdot \sum_{k=0}^{n} \frac{|\mathcal{F}(n)|}{|\mathcal{F}_0^k(n)|} =$$

$$|\mathcal{F}(n)| \cdot \prod_{k=1}^{n}(1 + 2^k) = 2^{2n+n^2} \prod_{k=1}^{n}(2^k + 1)(2^k - 1) = 2^{2n+n^2} \prod_{k=1}^{n}(4^k - 1) = |\mathcal{C}(n)|$$

confirming Equation (10).

Random Clifford circuit generation: In an embodiment, the algorithm or method for generating a random Clifford operator (circuit) is summarized in TABLE 1. Since the number of Hadamards k in the Bruhat decomposition is invariant under multiplications of U on the left and on the right by any elements of the H-free subgroup, we conclude that a random uniform Clifford operator $U \in C_n'$ can be generated as follows. First, we can define the probability distribution $\{p_k\}|_{k=0 \ldots n}$ follows:

$$p_k = 2^{\frac{k(k+1)}{2}} \binom{n}{k}_2 \cdot \prod_{k=1}^{n}(1 + 2^k)^{-1}. \quad (13)$$

TABLE 1

| Algorithm 1 Random Clifford Operator |  |
| --- | --- |
| 1: | Sample k ∈ [0, n] from the distribution $p_k$, see Eq. (13) |
| 2: | Sample L ∈ $\mathcal{F}_n$ uniformly at random |
| 3: | Sample R ∈ $\mathcal{F}_n$ uniformly at random |
| 4: | Return U = LH$^k$R |

It remains to show how to generate a random uniform element of the H-free subgroup. To this end we can define several subgroups of $\mathcal{F}_n$. For brevity, we suppress the n-dependence of various subgroups. An example of such subgroups is provided in TABLE 2.

TABLE 2

| Subgroup of $\mathcal{F}_n$ | Generated by |
| --- | --- |
| $\mathcal{F}^P$ | P gates |
| $\mathcal{F}^{CZ}$ | CZ gates |
| $\mathcal{F}^{CNOT}$ | CNOT gates |
| $\mathcal{F}^X$ | X gates |

In an embodiment, any element $F \in \mathcal{F}_n$ can be uniquely written as:

$$\mathcal{F} = \mathcal{F}^X \cdot \mathcal{F}^{CNOT} \cdot \mathcal{F}^{CZ} \cdot \mathcal{F}^P \quad (14)$$

where $\mathcal{F}^a$ is an element of the respective subgroup $\mathcal{F}^a$. The uniqueness of the decomposition in Equation (14) implies that $\mathcal{F}$ is a random uniform element of $\mathcal{F}_n$ whenever all factors $\mathcal{F}^a$ are random uniform elements of the respective subgroups $\mathcal{F}^a$. Generating a random uniform element of $\mathcal{F}^P$ and $\mathcal{F}^X$ is straightforward: for each of n qubits apply $P^a$ and $X^b$ respectively, where $a \in \{0, 1, 2, 3\}$ and $b \in \{0, 1\}$ are random uniform. Likewise, to generate a random uniform element of $\mathcal{F}^{XZ}$, for each pair of qubits apply $CZ^c$, where $c \in \{0, 1\}$ is random uniform. However, it may be needed to generate a random uniform element of $\mathcal{F}^{CNOT}$. Note that $\mathcal{F}^{CNOT}$ is isomorphic to the group of invertible binary matrices:

$$GL(n)=\{M\in \{0,1\}^{n\times n}: \det(M)=1(\bmod\ 2)\}.$$

Indeed, $F\in \mathcal{F}^{NOT}$ if $F|x\rangle = |Mx\rangle$ for all $x\in \{0,1\}^n$, where $M\in GL(n)$. Here $Mx$ is the matrix-vector multiplication modulo two. Selecting (picking) a random uniform matrix $M\in \{0, 1\}^{n\times n}$ and testing whether M is invertible and produces a random uniform element of GL(n) with a success probability of, for example, $P_s \approx 0.29$ can be performed efficiently for a relatively small n-qubit set. The success probability can be amplified to $1-P_s^m$ by repeating the protocol m times. In practice, testing the invertibility takes time $O(n^3)$, which can be too expensive for a large number n of qubits. Therefore, according to some embodiments of the present invention, we adopt a much more efficient algorithm. The algorithm has a runtime $O(n^2)$ with a small constant coefficient, consumes $n^2+O(1)$ random bits, and outputs a CNOT circuit of length $O(n^2)$ realizing a random uniformly distributed element of GL(n). The number of random bits consumed by the algorithm is nearly optimal since the group GL(n) has size $2^{n^2-O(1)}$.

In an embodiment, we define basis vectors $e^1, \ldots, e^n \in \{0,1\}^n$ such that $e^i$ has a single nonzero bit at the i-th position. We consider bit strings as row vectors. Fix a non-zero vector $v\in \{0, 1\}^n$ with the first nonzero bit at the r-th position. Define a matrix $\Gamma_v \in GL(n)$ such that the i-th row of $\Gamma_v$ equals $e^i$ for all $i\neq r$ and the r-th row of $\Gamma_v$ equals v. We have $e^rT_v=v$. The Clifford operator corresponding to $\Gamma_v$ can be realized by CNOT circuit as follows:

$$\Gamma_v = \prod_{r<i\leq n}(CNOT_{r,i})^{v_i}. \tag{15}$$

Here all CNOTs have control qubit r. We define $\mathcal{M}(v)$ as the set of all matrices $\mathcal{M}\in GL(n)$ such that the first row of $\mathcal{M}$ is v. The above shows that:

$$\mathcal{M}(v)=\mathcal{M}(e^r)\cdot \Gamma_v = \mathcal{M}(e^1)\cdot SWAP_{1,r}\Gamma_v$$

where $SWAP_{1,r}$ swaps qubits 1 and r. Furthermore, $$\mathcal{M}(e^1) \equiv GL(n-1)\times \{0,1\}^{n-1} \tag{16}$$

Since $M\in \mathcal{M}(e^1)$ if the first row of M is $e^1$, the first column of M is $(1w)^T$ for some $w\in \{0, 1\}^{n-1}$, and the matrix obtained from M by removing the first row and the first column is in $GL(n-1)$. The above shows that any $M\in GL(n)$ can be uniquely written as follows:

$$M=\Gamma_{1w}^T\cdot \text{diag}[1,K]\cdot SWAP_{1,r}\Gamma_v. \tag{17}$$

where $K\in GL(n-1)$ and $\text{diag}[1, K]$ is the block-diagonal matrix with blocks of size 1 and n−1. That is:

$$\text{diag}[1, K] = \left[\begin{array}{c|c} 1 & \\ \hline & K \end{array}\right]$$

Furthermore, if M is a random uniform element of GL(n) then the first row of M is a random uniform nonzero n-bit string. Therefore, the algorithm for generating a random invertible matrix, according to an embodiment of the present invention, can be defined recursively as shown in TABLE 3.

TABLE 3

Algorithm 2 Random Invertible Matrix

1: function RAND(n)
2:  if n = 1 then
3:   return M = 1
4:  end if
5:  Sample $v \in \{0, 1\}^n \setminus 0^n$ uniformly at random
6:  Sample $w \in \{0, 1\}^{n-1}$ uniformly at random
7:  r ← position of the first nonzero bit of v
8:  return $M = \Gamma_{1w}^T \cdot \text{diag}[1, \text{RAND}(n-1)] \cdot SWAP_{1,r}\Gamma_v$
9: end function By tracing back the recursion steps, the final matrix M is represented as a product of n−1 matrices $\Gamma$, $\Gamma^T$, and SWAP. Using Equation (15) one can realize each matrix $\Gamma$ or $\Gamma^T$ by a CNOT circuit of a size at most n. Furthermore, each SWAP can be realized using, for example, 3 CNOTs. This gives a CNOT circuit of size $O(n^2)$ realizing a random uniform element $M\in GL(n)$. If needed, the matrix of M can be computed in time $O(n^3)$ by multiplying the CNOT gates in the circuit realizing M. Likewise, one can obtain the matrix of $M^{-1}$ by multiplying the CNOT gates in the reverse order (recall that CNOT is self-inverse). By combining all the above steps, we can generate an algorithm with a runtime $O(n^2)$ that outputs a Clifford circuit of length $O(n^2)$ realizing a random uniformly distributed n-qubit Clifford circuit.

In an embodiment, a simplified version of another algorithm that generates a random uniform Clifford operator is provided herein. We define $\mathcal{P}_n$ as the set of n-qubit self-adjoint Pauli operators. By definition, any operator $O\in \mathcal{P}_n$ has the form:

$$O=\pm O_1\otimes O_2\otimes \ldots \otimes O_n, O_i\in \{I,X,Y,Z\}.$$

We define a set of anti-commuting Pauli pairs:

$$\mathcal{AP}_n=\{(O,O')\in \mathcal{P}_n\times \mathcal{P}_n: OO'=-O'O\}. \tag{18}$$

A Clifford operator $D\in C_n$ decouples a pair $(O, O')\in \mathcal{AP}_n$ if $$D^{-1}OD=x_1 \text{ and } D^{-1}O'D=z_1. \tag{19}$$

Any pair $(O, O')\in \mathcal{AP}_n$ can be decoupled by some Clifford operator D with CNOT cost at most $(3/2)n+O(1)$. The decoupling operator D can be computed in time $O(n)$. The present algorithm has also a runtime $O(n^2)$ and outputs a Clifford circuit of size $O(n^2)$ realizing a random uniformly distributed element of $C_n$. The algorithm is optimal in the sense that it consumes $\log 2 |C_n'|$ random bits. Below we use a convention that $C_0'$ contains a single element 1 and $A\otimes 1\equiv A$ for any operator A. The algorithm is summarized in TABLE 4.

TABLE 4

Algorithm 3

1: function KS(n)
2:  if n = 0 then
3:   return U = 1
4:  end if
5:  Sample $(O, O') \in \mathcal{AP}_n$ uniformly at random
6:  D ← Clifford operator decoupling(O, O'), see Eq. (19)
7:  return $U = D(I \otimes KS(n-1))$
8: end function The algorithm is based on the isomorphism:

$$C_n' \cong \mathcal{AP}_n \times \mathcal{AP}_{n-1} \times \ldots \times \mathcal{AP}_1. \quad (20)$$

To prove Eq. (20), we fix a pair (O, O')– $\mathcal{AP}_n$ and an operator D∈ $C_n$ that decouples (O, O'). The set of Clifford operators U∈ $C_n$ satisfies:

$$O = UX_1 L^{-1} \text{ and } O' = UZ_1 U^{-1} \quad (21)$$

which is isomorphic to $C_{n-1}$' (as a set). Indeed, if V=D$^{-1}$U, then VX$_1$V$^{-1}$=X$_1$ and VZ$_1$V$^{\dagger}$=Z$_1$, that is, V∈ I⊗C$_{n-1}$. Therefore $$U \in D(I \otimes C_{n-1}').$$

Any pair (O, O') can be represented as in Equation (21). Proceeding inductively proves Equation (20) and confirms the correctness of Algorithm 3.

In an embodiment, we explicitly construct a decoupling operator D that maps anti-commuting Pauli's O and O' to $x_1$ and $z_1$ respectively, see Equation (19). In an embodiment, our goal is to minimize the CNOT cost of D. The Pauli operators O and O' are in the standard form if their action on any qubit j falls into one of the five cases shown in TABLE 5.

TABLE 5

| Case | A | B | C | D | E |
|---|---|---|---|---|---|
| $O_j$ | X | X | X | I | I |
| $O'_j$ | Z | X | I | Z | I |

Recall that the single-qubit Clifford group C1 acts by permutations on the Pauli operators x, y, z. Therefore, one can transform any Pauli pair 0, O' into the standard form by applying a layer of single-qubit Clifford operators. This gives rise to a partition of n qubits into five disjoint subsets, [n]=ABCDE. Note that A has an odd size since otherwise O and O' would commute. We define A(j) as the j-th qubit of A. Next, we apply the following circuit shown in TABLE 6.

TABLE 6

| Algorithm 4 Decoupling circuit | |
|---|---|
| 1: if 1 ∉ A then | |
| 2:    SWAP$_{1,A(1)}$ | |
| 3: end if | ▷ Now O$_1$ = X and O'$_1$ = z |
| 4: for j ∈ C do | ▷ Clean O from C |
| 5:    CNOT$_{1,j}$ | |
| 6: end for | |
| 7: for j ∈ D do | ▷ Clean O' from D |
| 8:    CNOT$_{j,1}$ | |
| 9: end for | |
| 10: i ← first qubit of B | |
| 11: for j ∈ B \ {i} do | ▷ Clean O, O' from B \ {i} |
| 12:    CNOT$_{i,j}$ | |
| 13: end for | |
| 14: CNOT$_{i,1}$H$_i$CNOT$_{1,i}$ | ▷ Clean O, O' from i |
| 15: k ← (\|A\| − 1)/2 | |
| 16: for j = 1 to k do | ▷ Clean O, O' from A \ {1} |
| 17:    CNOT$_{A(2j+1),A(2j)}$ | |
| 18:    CNOT$_{A(2j),A(1)}$ | |
| 19:    CNOT$_{A(1),A(2j+1)}$ | |
| 20: end for | |

If D is the operator realized by the above circuit combined with the initial layer of single-qubit Cliffords, a direct inspection shows that D has the desired decoupling property Equation (19) up to sign factors. The latter can be fixed by applying Pauli $x_1$ or $y_1$ or $z_1$ as the last gate of D. The resulting circuit has the CNOT count at most (3/2)|A|+|B|+|C|+|D|+O(1)≤(3/2)n+O(1).

With respect to Step 5 of Algorithm 3, i.e., sampling an anti-commuting Pauli pair (O, O')∈ $\mathcal{AP}_n$ uniformly at random, we parameterize O∈ $P_n$ by a vector v∈ {0, 1}$^{2n}$ such that $$O \sim \prod_{j=1}^{n} x_j^{v_{2j-1}} z_j^{v_{2j}}.$$

For simplicity, we ignore the phase of O. We also parameterize O' similarly by a vector v'∈ {0,1}$^{2n}$. The anti-commutation condition OO'=−O'O is equivalent to $$\Sigma_{j=1}^{n} v_{2j-1} v_{2j}' + v_{2j} j_{2j-1}' = 1 (\text{mod } 2). \quad (22)$$

We select an integer i∈ {1, 2, . . . , 4$^n$−1} uniformly at random. We define v∈ {0, 1}$^{2n}$ to be the binary representation of i. We select an integer j∈ {1, 2, . . . , 2$^{n-1}$} uniformly at random and provide v'∈ {0, 1}$^{2n}$ be the j-th solution of equation (22). We note that equation (22) is linear modulo two, for a fixed vector v. Equation (22) has 2$^{2n-1}$ solutions v' that can be easily enumerated by integers. Once the action of O, O' on each qubit is fixed, we select the signs of O, O' uniformly at random.

Entanglement and superposition removal from a Clifford circuit: In an embodiment, we focus on the following problem: given a Clifford operation defined by the circuit C, and applied to an unknown computational input state |x⟩, we construct as small of a Clifford circuit D as possible such that the state D(C(|x⟩)) is a computational basis state with possible phases. Such a circuit D removes the observable "quantumness," including entanglement and superposition, introduced by the circuit C. Such circuit D can be used as the last step in randomized benchmarking protocols, when it is shorter than C$^{-1}$. Naturally, D:=C$^{-1}$ accomplishes the goal, however a shorter circuit may exist. To find one, we rely on Bruhat decomposition, and implement only one of the two elements of $\mathcal{F}$ (n) participating in the Bruhat decomposition, and do so up to left multiplication by an element of the corresponding group $\mathcal{F}^k$(n). Specifically, if C=f$_1$·H$^k$·f$_2$, where f$_1$ and f$_2$ implement elements of $\mathcal{F}$ (n), we want to find a shortest possible circuit g such that there exists a circuit f$^k$ implementing an element of $\mathcal{F}^k$(n) such that f$^k$·g=f$_2$. In such case, the circuit g$^{-1}$·H$^k$ is the desired circuit D.

In an embodiment, in order to find g, we start with f$_2$ as a first suitable candidate, and perform a number of gate-level reductions. Firstly, we write f$_2$ as a four-stage computation implementing a stage of not gates, an element of general linear group, GL(n), obtained with the CNOT gates, a stage of CZ gates, and a stage of P gates. The reduction of the number of gates in f$_2$ can take four steps:

1. The leftmost stage consists of only not gates. They can all be 'moved' to the left through H$^k$ stage and merged with f1. Recall that H NOT=Z H and I NOT=NOT I. This means that after simplification, the first stage contains no gates.

2. Write the CNOT part of the computation as an invertible Boolean n×n matrix M. The matrix M has the following block structure, $$M = \begin{bmatrix} M_{k \times k} & M_{(n-k) \times k} \\ M_{k \times (n-k)} & M_{(n-k) \times (n-k)} \end{bmatrix}. \quad (23)$$

To implement reversible linear transformation given by the matrix M, we first find a sequence of gates:

$$g_1 g_2 \cdots g_s : \begin{bmatrix} M_{k \times k} & M_{(n-k) \times k} \\ M_{k \times (n-k)} & M_{(n-k) \times (n-k)} \end{bmatrix} \rightarrow \begin{bmatrix} M'_{k \times k} & M'_{(n-k) \times k} \\ 0 & M'_{(n-k) \times (n-k)} \end{bmatrix}, \quad (24)$$

and then a circuit $F_{CNOT}^k$ that finishes the implementation by fully diagonalizing the matrix M. The overall circuit implementing M can be obtained by the concatenation $F_{CNOT}^k \cdot g_s g_{s-1} \cdots gf$. We note that this means that we can keep only the $g_s g_{s-1} \cdots g_1$ piece and merge $F_{NOT}^k$ with $f_1$. The number s of the CNOT gates sufficient to preform the mapping in Eq. (24) is upper bounded by min{k, n−k}+k(n−k). This is because min{k, n−k} CNOT gates may be needed to copy linearly independent rows (considering linear independence as it applies to the first k columns) into the top k rows, and at most k(n−k) CNOT gates are needed to reduce matrix $M_{k \times (n-k)}$ to the matrix with all zeroes, 0. We note that in practice one can often do better than the upper bound prescribes. This step of the reduction leads to substantial CNOT gate savings since the block $M_{k \times (n-k)}$ is at most a quarter of the size of the matrix M.

3. To reduce CZ gates, we rewrite the three-stage circuit -C-CZ-P- with CNOT-, CZ-, and P-gate stages as the three-stage computation -CZ-P-C- using phase polynomials. We observe that such transformation does not change the circuit in the stage -C-, and thus the number of gates in it remains minimized. This transformation exposes CZ gates, all of which commute, on the left and allows merging them into the circuit $f_1$. The only gates (see FIG. 1) that remain in $f_2$ are those operating on the top k qubits, of which there are at most $$\frac{k(k-1)}{2}.$$

4. Finally, to reduce P gates, we move them through the remaining CZ gates (recalling that all diagonal gates commute) and we cancel all but possibly top k Phase gates. The reduced $f_2$ contains no more than min{k, n−k}+k(n−k) CNOT gates, no more than $$\frac{k(k-1)}{2} CZ$$

gates, and no more than k P gates.

We propose that an arbitrary Clifford circuit can be decomposed into a plurality of stages -NOT-P-C-CZ-H-CZ-H-P-. This can be proved as follows. We start with the decomposition $f_1 \cdot H^k \cdot f_2$, where $f_1, f_2 \in \mathcal{F}(n)$, and perform a slightly different reduction of $f_2$ than the one described above. Specifically, we first push all NOT gates to the left side of the circuit to obtain the decomposition of the form -NOT-P-C-CZ-H-$C_1$-CZ-P-. We implement the transformation provided in equation (24) (part of the stage C1) up to the "SWAPping" that puts linearly independent rows into the upper left k×k block of the matrix M. This "SWAPping" is implemented with SWAP gates, that for now are commuted to the rightmost side of the circuit implementing the desired Clifford transformation, giving the gate sequence -NOT-P-C-CZ-H-$C_2$-$C_Z$-P-SWAP-. By selecting the SWAP gates, the stage -$C_2$-can be implemented by the CNOT gates with controls on the top k qubits and targets on the bottom n-k qubits. We next write -NOT-P-C-CZ-H-$C_2$-$C_Z$-P-SWAP- as -NOT-P-C-CZ-H-$CZ_1$-$C_2$-P-SWAP-, where the reduced stage -$CZ_1$- applies CZ gates to the top k qubits. Recall that changing the order of -C- and -CZ-stages does not change the -C- stage. We write the stage -$C_2$- as -$H_1$-$CZ_2$-$H_1$- to obtain the decomposition of the form -NOT-P-C-CZ-H-$CZ_1$-$H_1$-$CZ_2$-$H_1$-P-SWAP-. We observe that the Hadamard gates in -$H_1$- operate on the bottom n-k qubits, and recall that CZ gates in -$CZ_1$- stage operate on the top k qubits. Thus, these two stages can be commuted to obtain -NOT-P-C-CZ-H-$H_1$-$CZ_1$-$CZ_2$-H1-P-SWAP-, that is equal to -NOT-P-C-CZ-H-$CZ_1$-$CZ_2$-$H_1$-P-SWAP- once the Hadamard gate stages are merged, and further reduces to -NOT-P-C-CZ-H-$CZ_1$-$H_1$-P-SWAP- by combining neighboring -CZ- stages. Finally, we push the -SWAP- stage to the left and merge it with the -C- stage to obtain the desired -NOT-P-C-CZ-H-CZ-H-P- (indices are dropped since they are no more necessary).

We remark that the decomposition in the statement above that an arbitrary Clifford circuit can be decomposed into stages -NOT-P-C-CZ-H-CZ-H-P- has only three two-qubit gate stages. This decomposition can be used to implement arbitrary Clifford operation in two-qubit gate depth 9n in the Linear Nearest Neighbor architecture by rewriting it as -NOT-P-C-$\overline{CZ}$-H-$\overline{CZ}$-H-P- and improving the previous upper bound of 14n−4.

Further reductions can be obtained by employing synthesis algorithms that exploit the structure better than the naive algorithms do, applying local optimizations, and looking the implementation up in the meet-in-the-middle style optimal synthesis approach for the elements of $\mathcal{F}(n)$. We note that since the circuits implementing the reduced stage $f_2$ are small at the offset, chances are their optimal implementations will have a less than average cost, and thus they may be found even by an incomplete meet-in-the-middle algorithm incapable of finding optimal implementation of arbitrary elements of $\mathcal{F}(n)$.

Structure of the CNOT circuits: In an embodiment, we can study linear reversible circuits in more detail. We show that so long as one is concerned with the CNOT gate count, a linear reversible function may be implemented more efficiently as a Clifford circuit as opposed to a circuit relying on the CNOT gates only, and provide two algorithms for optimizing the number of two-qubit gates in the CNOT circuits. Our result implies that quantum computations by Clifford circuits are more efficient than classical computations by reversible CNOT circuits (see Example 1 below for explicit construction).

Given a bit string $a \in \mathbb{F}_2^n$ let H(a) be the product of Hadamards over all qubits j with $a_j=1$. We suppose W is a CNOT circuit on n qubits and a, $b \in \mathbb{F}_2^n$. Here we derive necessary and sufficient conditions under which H(b) WH(a)$\in \mathcal{F}(n)$, i.e., it is Hadamard free. First, we define a linear subspace as follows:

$$\mathcal{L}(a) = \{x \in \mathbb{F}_2^n : \text{Supp}(x) \subseteq \text{Supp}(a)\}.$$

We propose that given $W = \Sigma_x |Ux\rangle\langle x|$ for some binary invertible matrix $U \in GL(n)$, the operator H(b)W H(a)$\in \mathcal{F}(n)$ if and only if $U \cdot \mathcal{L}(a) = \mathcal{L}(b)$. This can be verified by defining the state $|\psi\rangle = H(b)WH(a)|0^n\rangle$. Using Bruhat decomposition we can check that H(b)W H(a)$\in \mathcal{F}(n)$ if $|\psi\rangle$ is proportional to a basis vector. From the operation $U \cdot \mathcal{L}(a) = \mathcal{L}(b)$ we can obtain $|\psi\rangle = |0^n\rangle$ which implies H(b)

WH(a)∈ $\mathcal{F}$(n). Conversely, assuming H(b)WH(a)∈ $\mathcal{F}$(n), that is, $|y\rangle = e^{jc\pi/2}|c\rangle$ for some c∈ $\mathbb{F}_2^2$ and k∈ {0, 1, 2, 3}. Then:

$$WH(a)|0^n\rangle \sim H(b)|c\rangle = H(b)X(c)|0^n\rangle = Z(b \cap c)X(c\backslash b)H(b)|0^n\rangle.$$

We Define a linear subspace $\mathcal{M} = U \cdot \mathcal{L}(a)$. Then:

$$\sum_{x \in \mathcal{M}} |x\rangle \sim Z(b \cap c)X(c\backslash b) \sum_{x \in \mathcal{L}(b)} |x\rangle.$$

We define lhs and rhs as, respectively, the left and right hand sides on this equation. The lhs has a non-zero amplitude on $|0^n\rangle$ and so must the rhs. Therefore, c\b∈ $\mathcal{L}$(b) and we can ignore the Pauli X(c\b). All amplitudes of the lhs have the same sign and so are amplitudes of the rhs. This is only possible if b∩c∈ $\mathcal{L}(a)^\perp$ and we can ignore the Pauli Z(b∩c). Thus, we can write:

$$\sum_{x \in \mathcal{M}} |x\rangle \sim \sum_{x \in \mathcal{L}(b)} |x\rangle$$

which is only possible if $\mathcal{M} = \mathcal{L}(b)$, that is, $U \cdot \mathcal{L}(a) = \mathcal{L}(b)$.

Based on the above proposition, we formulate the following algorithm that optimizes the number of two-qubit gates in a CNOT circuit. Given a CNOT circuit W we check whether multiplying W on the left and on the right by Hadamard gates on some subsets of qubits gives a transformation $\tilde{W} := H(b)WH(a) \in \mathcal{F}$(n). We rely on a compiler for the elements of $\mathcal{F}$(n), such as an optimal compiler for small n, to generate an efficient implementation of $\tilde{W}$. If the number of two-qubit gates used by $\tilde{W}$ is smaller than that in the W, we replace W with H(b) $\tilde{W}$H(a), leading to the two-qubit gate count reduction.

Next, we can state a sufficient condition under which H(b)WH(a)=W We suppose W=$\Sigma_x|Ux\rangle\langle x|$ for some binary invertible matrix U∈ GL(n). We also suppose that $U \cdot \mathcal{L}(a) = \mathcal{L}(b)$ and $Ux = (U^{-1})^T x$ for any x∈ $\mathcal{L}(a)$. Then, we can write H(b)WH(a)=W. This can be proved by defining $U^* := (U^{-1})^T$ and $\tilde{W} := H(b)WH(a)$. We can use the following well-known identities:

$$WX(\gamma)W^{-1} = X(U\gamma) \text{ and } WZ(\gamma)W^{-1} = Z(U^*\gamma) \text{ for all } \gamma \in \mathbb{F}_2^n. \quad (25)$$

We then write $X(\gamma) = X(\gamma_{in})X(\gamma_{out})$, where $\gamma_{in} = \gamma \cap a$ and $\gamma_{out} = \gamma \backslash a$. Then, we can write:

$$\tilde{W}X(\gamma_{in})\tilde{W}^{-1} = H(b)WZ(\gamma_{in})W^{-1}H(b) = H(b)Z(U^*\gamma_{in})H(b) = X(U^*\gamma_{in}) = X(U\gamma_{in}) \quad (26)$$

Here, we use equation (25) and note that $U^* \gamma_{in} \in \mathcal{L}$(b). Likewise, $$\tilde{W}X(\gamma_{out})\tilde{W}^{-1} = H(b)WX(\gamma_{out})W^{-1}H(b) = H(b)X(U\gamma out)H(b). \quad (27)$$

We provide that $U\gamma_{out}$ and b have non-overlapping supports. Indeed, we select any vector β∈ $\mathcal{L}$(b). By assumption, β=U*δ for some δ∈ $\mathcal{L}$(a). Thus, $$\beta^T U\gamma_{out} = (U^*\delta)^T U\gamma_{out} = \delta^T U^{-1} U\gamma_{out} = \delta^T \gamma_{out} = 0,$$

since δ and $\gamma_{out}$ have non-overlapping supports. This shows that $U\gamma_{out}$ is orthogonal to any vector in $\mathcal{L}$(b), that is, $U\gamma_{out}$ and b have non-overlapping supports. Thus $X(U\gamma_{out})$ commutes with H(b) and equation (27) gives:

$$\tilde{W}X(\gamma_{out})\tilde{W}^{-1} = X(U\gamma_{out}). \quad (28)$$

By combining equations (26) and (28), we obtain:

$$\tilde{W}X(\gamma)W^{-1} = X(U\gamma_{in})X(U\gamma_{out}) = X(U_\gamma).$$

We can apply the same argument applies to show that:

$$\tilde{W}Z(\gamma)W^1 = Z(U^*\gamma).$$

Therefore, $\tilde{W} = W$.

A benefit of the above proposition that provides H(b)WH(a)=W in comparison to the proposition the operator H(b)WH(a)∈ $\mathcal{F}$(n) if and only if $U \cdot \mathcal{L}(a) = \mathcal{L}(b)$ is the W constructed is equal to the original W, and thus the result of H(b)WH(a)=W can be applied to sub-circuits of a given CNOT circuit. This allows the introduction of the Hadamard gates that can be used to turn some of the neighboring CNOT gates into CZ gates, and then induce those CZ gates via a set of phases, thus requiring no two-qubit gates to implement the given CZ's. We illustrate this optimization algorithm with an example.

Figure 4:
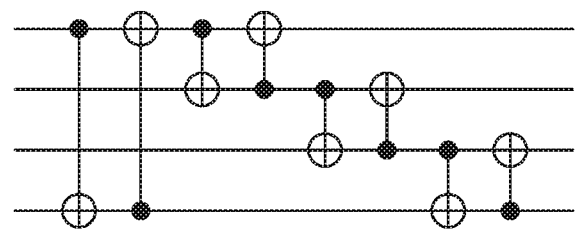
FIG. 4 is a schematic diagram showing an example CNOT-optimal reversible circuit, according to an embodiment of the present invention.
Figure 5:
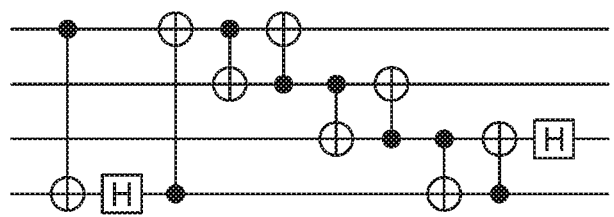
FIG. 5 is a schematic diagram of an equivalent quantum circuit obtained from the quantum circuit shown in FIG. 4, according to an embodiment of the present invention.
Figure 6:
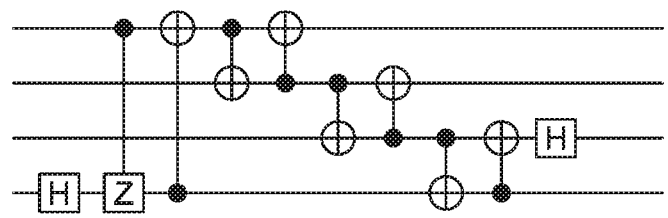
FIG. 6 is a schematic diagram of a quantum circuit obtained from the quantum circuit shown in FIG. 5 after commuting the leftmost CNOT gate through the leftmost Hadamard gate by turning the former into a CZ gate, according to an embodiment of the present invention.
Figure 7:
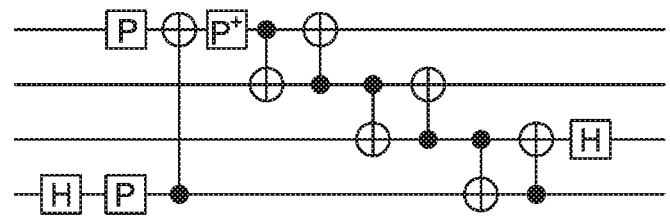
FIG. 7 is a schematic diagram of a quantum circuit obtained from the quantum circuit shown in FIG. 6, where a desired cz is induced by inserting Phase gates, according to an embodiment of the present invention.

FIG. 4 is a schematic diagram showing an example CNOT-optimal reversible circuit, according to an embodiment of the present invention. We establish its optimality by breadth first search. We notice that the sub-circuit spanning gates 2 through 8 implements a transformation that satisfies the conditions H(b)WH(a)=W, a=$0001_2$=1 and b=$0010_2$=2. This allows us to rewrite the circuit shown in FIG. 4 in an equivalent form as the circuit shown in FIG. 5. FIG. 5 is a schematic diagram of an equivalent quantum circuit obtained from the quantum circuit shown in FIG. 4, according to an embodiment of the present invention. We next commute leftmost CNOT gate through leftmost Hadamard gate, by turning former into a CZ gate, to obtain the quantum circuit shown in FIG. 6. FIG. 6 is a schematic diagram of a quantum circuit obtained from the quantum circuit shown in FIG. 5 after commuting the leftmost CNOT gate through the leftmost Hadamard gate by turning the former into a CZ gate, according to an embodiment of the present invention. We notice that the phase polynomial formalism the cz(x, y) can be implemented as a set of Phase gates P(x), P(y), $P^\dagger(x \oplus y)$. All three linear functions, x, y, and x⊕y, already exist in the linear reversible circuit. Thus, we can induce the desired CZ by inserting Phase gates (for simplicity, we insert Phase gates at the first suitable occurrence) to obtain the optimized circuit shown in FIG. 7. FIG. 7 is a schematic diagram of a quantum circuit obtained from the quantum circuit shown in FIG. 6, where a desired CZ is induced by inserting Phase gates, according to an embodiment of the present invention. The quantum circuit shown in FIG. 7 contains only 7 two-qubit gates, thus beating the best possible CNOT circuit while faithfully implementing the underlying linear reversible transformation. We note that this circuit can also be obtained using the algorithm resulting from Lemma 5 with an access to proper $\mathcal{F}$(4) compiler, such as the meet-in-the-middle optimal compiler. In the above paragraph, we illustrate the advantage quantum Clifford circuits offer over linear reversible CNOT circuits.

However, a Quantum advantage by Clifford circuits over reversible CNOT circuits may not be more than by a constant factor. If we suppose U is a classical reversible linear function on n bits that can be implemented by a Clifford circuit W with g CNOT, and G total gates from the library {P, H, CNOT}. Trivially, G∈O(g), as we can ignore all qubits affected by the single-qubit gates only. We next show that there exists a CNOT circuit composed of O(g) CNOT gates, spanning 2n bits, and implementing U, and thus quantum advantage by Clifford circuits cannot be more than by a constant factor. Indeed, we consider the operation U written in the tableau form. Each gate, P, H and CNOT is equivalent to a simple linear transformation of the 2n×2n tableau. Specifically, P corresponds to a column addition (one CNOT gate over a linear reversible computation with 2n bits), H corresponds to the column swap (three CNOT gates over a linear reversible computation with 2n bits), and CNOT corresponds to the addition of a pair of columns (two CNOT gates over a linear reversible computation with 2n bits). Thus, the total number of CNOT gates in a 2n×2n linear reversible computation implementing the tableau does not exceed 3G=O(g). We note that the top left n×n block of the tableau coincides with the original linear transformation U.

Quantum advantage for CNOT circuits: We already shown that classical reversible linear functions can be implemented with fewer CNOTs by making use of single-qubit Clifford gates. More precisely, we suppose U is a classical reversible linear function. In an embodiment, we provide g=g(U) and G=G(U) as the minimum number of CNOTs required to implement U using gate libraries {CNOT} and {P, H, CNOT} respectively. We have shown that $\Omega(g) < G \leq g$. Furthermore, G<g in certain cases.

In an embodiment, a quantum circuit W implements U modulo phases if $W|x\rangle = e^{if(x)}|U(x)\rangle$ for any basis state x, where f(x) is an arbitrary function. We note that the extra phases can be removed simply by measuring each qubit in the 0, 1 basis. G*=G*(U) is the minimum number of CNOTs that may be needed to implement U modulo phases using a gate library {P, H, CNOT}. By definition, G*≤G. A straightforward example when G*<G is provided by the SWAP gate. A calculation shows that:

$$\text{SWAP} \cdot CZ = H^{\otimes 2} \cdot CZ = H^{\otimes 2} \cdot CZ \cdot H^{\otimes 2}. \quad (29)$$

The right-hand side of equation (29) can be transformed into a circuit with two CNOTs and two Hadamard gates while the left-hand side implements SWAP gate modulo phases showing that G*~(swap)<2. At the same time, it is known that G(SWAP)=3. The following proposition provides a multi-qubit generalization of this example.

We Consider a classical reversible linear function U on n bits such that U(x)=Ax for some symmetric matrix A. Then $$G^*(U) \leq \sum_{1 \leq i < j \leq n} A_{i,j} + (A^{-1})_{i,j}. \quad (30)$$

This proposition can be proved by defining a Clifford operator W such that
$$W|x\rangle = |U(x)\rangle.$$
for all x. We also define diagonal Clifford operators $$D_+ = \prod_{1 \leq i < j \leq n} CZ^{A_{i,j}} \prod_{i=1} P^{A_{i,i}} \text{ and}$$

$$D_- = \prod_{1 \leq i < j \leq n} CZ^{(A^{-1})_{i,j}} \prod_{i=1} P^{(A^{-1})_{i,i}}.$$

Given a Clifford operator C, let $\boxtimes$ (C) be the stabilizer tableaux of C. A simple calculation provides $$\tau(W) = \begin{bmatrix} A & 0 \\ 0 & A^{-1} \end{bmatrix}, \tau(D_+) = \begin{bmatrix} I & 0 \\ A & I \end{bmatrix},$$

$$\tau(D_-) = \begin{bmatrix} I & 0 \\ A^{-1} & I \end{bmatrix}, \tau(H^{\otimes n}) = \begin{bmatrix} 0 & I \\ I & 0 \end{bmatrix}$$

and $$\tau(W) = \tau(H^{\otimes n}) \cdot \tau(D_+) \cdot \tau(H^{\otimes n}) \cdot \tau(D_-) \cdot \tau(H^{\otimes n}) \cdot \tau(D_+)$$

Thus $$W = Q \cdot H^{\otimes n} \cdot D_+ \cdot H^{\otimes n} \cdot D_- \cdot H^{\otimes n} \cdot D_+,$$

where Q is some Pauli operator. Equivalently, $$W \cdot D_+^{-1} = Q \cdot H^{\otimes n} \cdot D_+ \cdot H_{\otimes n} \cdot D_- \cdot H^{\otimes n}. \quad (31)$$

The right-hand side of equation (31) can be implemented using $$\sum_{1 \leq i < j \leq n} A_{i,j} + (A^{-1})_{i,j}$$

CNOTs. The left-hand side of equation (31) implements U modulo phases. For example, if U=SWAP, then $$A = A^{-1} = \begin{bmatrix} 0 & 1 \\ 1 & 0 \end{bmatrix}$$

and the bound in equation (30) gives G* (SWAP)≤2.

The following conjecture revisits some of the results discussed above, and formulates a new conjecture. We define Cost to be the number of CNOT gates in a given circuit. For a linear reversible function f, consider the following optimal circuits, with respect to the above Cost metric:

A is an optimal {CNOT} circuit implementing f;
B is an optimal {H, P, CNOT} circuit implementing f; )
C is an optimal {H, P, CNOT} circuit implementing f up to phases (i.e., C: |x⟩ →$i^k$I|f(x)⟩ for complex-valued i and k ∈ {0, 1, 2, 3});
D is an optimal {CNOT} implementation of f up to the SWAPping of qubits. Then, Cost(A)≥Cost(B)≥Cost(C)≥Cost(D).

The first two inequalities are straightforward. Less trivial is to establish that these are proper inequalities, but as shown earlier each is indeed a proper inequality. We conjecture that optimizations of linear reversible {CNOT} circuits by considering Clifford circuits and by admitting implementations up to a relative phase do not exceed optimizations from allowing to implement the {CNOT} circuit up to a permutation/SWAPping of the qubits.

As it can be understood from the above paragraphs, the structure of the Clifford group is studies and a parametrization of the Clifford group by layered quantum circuits is provided. In some embodiments, we leveraged this decomposition to demonstrate efficient $O(n^2)$ algorithm to draw a random uniformly distributed n-qubit Clifford unitary, demonstrated how to construct a small circuit that removes the entanglement from Clifford circuits, and implemented Clifford circuits in the Linear Nearest Neighbor architecture in two-qubit depth of only 9n. Clifford-free operations play a key role in our decomposition. We studied circuits for the Clifford-free set and showed the benefits by implementations with Hadamard gates. For example, in some embodiments, the smallest linear reversible circuit admitting advantage by Clifford gate has an optimal number of 8 CNOT gates (as a {CNOT} circuit), but it can be implemented with only 7 entangling gates as a Clifford circuit.

As it can be appreciated from the above paragraphs, another aspect of the present invention is to provide a classical computer configured to execute a non-transitory computer-executable code, the code when executed by the classical computer causes a quantum computer to: 1) generate a random Hadamard (H) gate; 2) draw a plurality of qubits from a probability distribution of qubits; 3) apply the random H gate to the plurality of qubits drawn from the probability distribution; 4) generate randomly a first Hadamard-free Clifford circuit (F1) and a second Hadamard-free Clifford circuit (F2), wherein each of the first and second Hadamard-free Clifford circuits is generated by randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and 5) combine the generated first Hadamard-free Clifford circuit (F1) and the second Hadamard-free Clifford circuit (F2) with the generated random Hadamard (H) gate to form the random uniformly distributed Clifford unitary circuit (C).

In an embodiment, the code may be stored in a computer program product which include a computer readable medium or storage medium or media. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. In another embodiment, the code can be downloaded from a remote conventional or classical computer or server via a network such as the internet, an ATM network, a wide area network (WAN) or a local area network. In yet another embodiment, the code can reside in the "cloud" on a server platform, for example. In some embodiments, the code can be embodied as program products in the conventional or classical computer such as a personal computer or server or in a distributed computing environment comprising a plurality of computers that interacts with the quantum computer by sending instructions to and receiving data from the quantum computer.

Generally, the classical or conventional computer provides inputs and receives outputs from the quantum computer. The inputs may include instructions included as part of the code. The outputs may include quantum data results of a computation of the code on the quantum computer.

The classical computer interfaces with the quantum computer via a quantum computer input interface and a quantum computer output interface. The classical computer sends commands or instructions included within code to the quantum computer system via the input and the quantum computer returns outputs of the quantum computation of the code to the classical computer via the output. The classical computer can communicate with the quantum computer wirelessly or via the internet. In an embodiment, the quantum computer can be a quantum computer simulator simulated on a classical computer. For example, the quantum computer simulating the quantum computing simulator can be one and the same as the classical computer. In another embodiment, the quantum computer is a superconducting quantum computer. In an embodiment, the superconducting quantum computer includes one or more quantum circuits (Q chips), each quantum circuit comprises a plurality of qubits, one or more quantum gates, measurement devices, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of generating a random uniformly distributed Clifford unitary circuit (C) comprising:
   generating a random Hadamard (H) gate;
   drawing a plurality of qubits from a probability distribution of qubits;
   applying the random H gate to the plurality of qubits drawn from the probability distribution;
   generating randomly a first Hadamard-free Clifford circuit (F1) and a second Hadamard-free Clifford circuit (F2), wherein each of the first and second Hadamard-free Clifford circuits is generated by at least randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and
   combining the generated first Hadamard-free Clifford circuit (F1) and the second Hadamard-free Clifford circuit (F2) with the generated random Hadamard (H) gate to form the random uniformly distributed Clifford unitary circuit (C).

2. The method according to claim 1, wherein the first and second Hadamard-free Clifford circuits are different from each other.

3. The method according to claim 1, wherein generating randomly the first Hadamard-free Clifford circuit (F1) and the second Hadamard-free Clifford circuit (F2) comprises randomly generating the uniformly distributed phase (P) gate, randomly generating the uniformly distributed linear Boolean invertible conditional NOT (CNOT) gate, and randomly generating a uniformly distributed conditional rotation around axis-Z (CZ) gate, and combining the P, CZ, and CNOT gates to form the first and second Hadamard-free Clifford circuits.

4. The method according to claim 3, wherein generating the CZ gate comprises generating the CZ gate from a plurality of random qubits.

5. The method according to claim 4, wherein generating the CZ gate from the plurality of random qubits comprises generating the CZ gate from a (n−1) n/2-tuple of random qubits, wherein n is greater than or equal to 2.

6. The method according to claim 1, wherein generating the uniformly distributed phase (P) gate comprises generating the P gate from a plurality of random qubits.

7. The method according to claim 6, wherein generating the P gate from the plurality of random qubits comprises generating the P gate from a 2n-tuple random qubits, where n is an integer greater than or equal to 2.

8. The method according to claim 7, wherein the P gate corresponds to a diagonal matrix having 1 or imaginary number i as diagonal elements and 0 everywhere else.

9. The method according to claim 1, wherein generating the uniformly distributed linear Boolean invertible conditional NOT (CNOT) gate comprises:
   generating a lower triangular random matrix having random qubits 0 and/or 1;
   generating an upper triangular random matrix having random qubits 0 and/or 1; and multiplying the lower triangular random matrix and the upper triangular random matrix to generate the uniformly distributed linear Boolean invertible CNOT gate.

10. The method according to claim 1, wherein the first Hadamard-free Clifford circuit F1 is equal to a product P1.CZ1.CNOT1 and the second Hadamard-free Clifford circuit F2 is equal to a product P2.CZ2.CNOT2 so that F1 is different from F2.

11. The method according to claim 1, wherein the random uniformly distributed Clifford unitary circuit C is equal to F1.H.F2, wherein F1 is the first Hadamard-free Clifford circuit, F2 is the second Hadamard-free Clifford circuit, and H is the Hadamard gate.

12. The method according to claim 1, wherein drawing the plurality of qubits from the probability distribution of qubits comprises drawing the plurality of qubits from the following probability distribution Pr(k):

$$Pr(k) = 2^{k(k+1)/2} \frac{\prod_{j=1}^{n}(2^j - 1)(2^j + 1)^{-1}}{\prod_{j=1}^{k}(2^j - 1)\prod_{j=1}^{n-k}(2^j - 1)}$$

wherein k is a sub-plurality of qubits selected from a plurality of qubits n such that k=0, 1, . . . , n, and j is a local variable in this equation.

13. The method according to claim 1, wherein a computational complexity of generating the random uniformly distributed Clifford unitary circuit (C) grows quadratically with a number of the plurality of qubits.

14. The method according to claim 1, further comprising providing the random uniformly distributed Clifford unitary circuit to a quantum mechanical circuit to measure noise in the quantum mechanical circuit.

15. A computer readable medium on which is stored non-transitory computer-executable code, which when executed by a classical computer causes a quantum computer to:
  generate a random Hadamard (H) gate;
  draw a plurality of qubits from a probability distribution of qubits;
  apply the random H gate to the plurality of qubits drawn from the probability distribution;
  generate randomly a first Hadamard-free Clifford circuit (F1) and a second Hadamard-free Clifford circuit (F2), wherein each of the first and second Hadamard-free Clifford circuits is generated by at least randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and combine the generated first Hadamard-free Clifford circuit (F1) and the second Hadamard-free Clifford circuit (F2) with the generated random Hadamard (H) gate to form the random uniformly distributed Clifford unitary circuit (C).

16. The computer readable medium according to claim 15, wherein the first and second Hadamard-free Clifford circuits are different from each other.

17. The computer readable medium according to claim 15, wherein when the non-transitory computer-executable code is executed by the classical computer further causes the quantum computer to randomly generate the uniformly distributed phase (P) gate, randomly generate the uniformly distributed linear Boolean invertible conditional NOT (CNOT) gate, and randomly generate a uniformly distributed conditional rotation around axis-Z (CZ) gate, and combine the P, CZ, and CNOT gates to form the first and second Hadamard-free Clifford circuits.

18. The computer readable medium according to claim 15, wherein when the non-transitory computer-executable code is executed by the classical computer further causes the quantum computer to:
  generate a lower triangular random matrix having random qubits 0 and/or 1;
  generate an upper triangular random matrix having random qubits 0 and/or 1; and
  multiply the lower triangular random matrix and the upper triangular random matrix to generate the uniformly distributed linear Boolean invertible CNOT gate.

19. The computer readable medium according to claim 15, wherein a computational complexity of forming the random uniformly distributed Clifford unitary circuit (C) grows quadratically with a number of the plurality of qubits.

20. A classical computer configured to execute a non-transitory computer-executable code, the code when executed by the classical computer causes a quantum computer to:
  generate a random Hadamard (H) gate;
  draw a plurality of qubits from a probability distribution of qubits;
  apply the random H gate to the plurality of qubits drawn from the probability distribution;
  generate randomly a first Hadamard-free Clifford circuit (F1) and a second Hadamard-free Clifford circuit (F2), wherein each of the first and second Hadamard-free Clifford circuits is generated by randomly generating a uniformly distributed phase (P) gate, and randomly generating a uniformly distributed linear Boolean invertible conditional NOT (CNOT) gate, and combining the P and CNOT gates to form the first and second Hadamard-free Clifford circuits; and
  combine the generated first Hadamard-free Clifford circuit (F1) and the second Hadamard-free Clifford circuit (F2) with the generated random Hadamard (H) gate to form the random uniformly distributed Clifford unitary circuit (C).

* * * * *